United States Patent [19]
Keller et al.

[11] Patent Number: 5,906,656
[45] Date of Patent: May 25, 1999

[54] METHOD AND SYSTEM FOR PROVIDING ACTIONS BY WAY OF ELECTRONIC DISTRIBUTIONS

[75] Inventors: Robert S. Keller, Grapevine; Marvin L. Williams, Lewisville, both of Tex.

[73] Assignee: International Business Machines Corporation, Armonk, N.Y.

[21] Appl. No.: 07/814,344

[22] Filed: Dec. 26, 1991

[51] Int. Cl.⁶ ................................................ G06F 13/00
[52] U.S. Cl. ........................ 709/200; 709/204; 709/206; 709/245; 710/5; 710/129
[58] Field of Search ..................................... 395/155, 278; 364/401, 419, 419.02; 709/200, 204, 238, 206, 245; 710/5, 129

[56] References Cited

U.S. PATENT DOCUMENTS

| | | | |
|---|---|---|---|
| 4,229,624 | 10/1980 | Haben et al. | 340/826 |
| 4,249,253 | 2/1981 | Gentili et al. | 371/38 |
| 4,837,699 | 6/1989 | Smay et al. | 364/424.023 |
| 4,914,586 | 4/1990 | Swinehart et al. | 395/612 |
| 4,942,552 | 7/1990 | Merrill et al. | 364/900 |
| 4,970,678 | 11/1990 | Sladowski et al. | 395/275 |
| 5,012,233 | 4/1991 | Poulsen et al. | 340/825.18 |
| 5,034,686 | 7/1991 | Aspelin | 324/537 |
| 5,113,502 | 5/1992 | Merrill et al. | 395/200.01 |
| 5,123,089 | 6/1992 | Beilinski et al. | 395/200.01 |
| 5,133,081 | 7/1992 | Mayo | 455/18 |
| 5,245,532 | 9/1993 | Mourier | 364/400 |
| 5,252,151 | 10/1993 | Tannenbaum et al. | 345/156 |
| 5,255,106 | 10/1993 | Castro | 358/400 |
| 5,278,984 | 1/1994 | Batchelor | 395/650 |
| 5,295,068 | 3/1994 | Nishino et al. | 364/419.02 |
| 5,313,580 | 5/1994 | Remion | 395/200 |
| 5,325,310 | 6/1994 | Johnson et al. | 364/514 R |
| 5,394,549 | 2/1995 | Stringfellow et al. | 395/650 |
| 5,553,223 | 9/1996 | Greenlee et al. | 395/155 |
| 5,557,752 | 9/1996 | Remion | 395/285 |

OTHER PUBLICATIONS

"Protection Against Infection by Computer Viruses", IBM TDB n2; Jul. 1990; pp. 318–320.

"MSG: A Simple Message System" by John Vittal, Computer Message Systems, Proceedings of the IFIP TC–6 International Symposium on Computer Message Systems, Ottawa, Canada, 6–8, Apr. 1981, North–Holland Publishing Company, NY, pp. 329–343.

Primary Examiner—Glenn A. Auve
Assistant Examiner—Ario Etienne
Attorney, Agent, or Firm—Geoffrey A. Mantooth

[57] ABSTRACT

An electronic mail object on a data processing system contains a request that the recipient perform an action. In addition, the electronic mail object contains an action or command for carrying out the request. Upon receipt of the electronic mail object, the recipient can carry out the request by selecting the action. The action is marked by starting and ending markers so that it can be isolated and extracted from the electronic mail object. Once extracted, the action is executed on the data processing system. In addition, the recipient can establish criteria for evaluating whether the selected command should be executed.

18 Claims, 7 Drawing Sheets

VIEW THE NOTE

```
From: ROEMARY2--VMSYS1          Date and time    12/23/81  13:53:34   E01
To:   JOHNSONG--VMSYS1  GE Johnson From: Mary Ann Roe   Department 45J   (ROEMARY2 at VMSYS1)
----- 1545 West Middle Highway, Big City, New State 99991
----- 1-212-555-1212 or 1-800-555-1212
Subject: System Spool Space Limits Exceeded Mr. Johnson,
       The number of spool files you have in your virtual reader has
exceeded the number you are allowed. Please receive or delete some
of them. If action is not taken in three days, they will be deleted
from the system. Thanks for your help in this matter.

END OF NOTE

PF1 Alternate PFs  PF2 File NOTE          PF3 Keep   PF4 Erase  PF5 Forward
PF6 Reply  PF7 Resend PF8 Print PF9 Help PF10 Next  PF11 Prev  PF12 Return
```

PRIOR ART

```
                        VIEW THE NOTE
From: ROEMARY2--VMSYS1        Date and time    12/23/81 13:53:34    E01
To:   JOHNSONG--VMSYS1 GE Johnson From: Mary Ann Roe  Department 45J  (ROEMARY2 at VMSYS1)
----- 1545 West Middle Highway, Big City, New State 99991
----- 1-212-555-1212 or 1-800-555-1212
Subject: System Spool Space Limits Exceeded Mr. Johnson,
      The number of spool files you have in your virtual reader has
exceeded the number you are allowed. Please receive or delete some
of them. To view a list of your reader files, place your cursor
under the following line and press ENTER.

.CMD RDRLIST

To discard all of your reader files, place your cursor under the
following line and press ENTER.

.CMD PURGE READER ALL

PF1 Alternate PFs  PF2 File NOTE       PF3 Keep    PF4 Erase   PF5 Forward
PF6 Reply  PF7 Resend  PF8 Print  PF9 Help  PF10 Next  PF11 Prev  PF12 Return
```

*Fig. 2*

```
JOHNSONG RDRLIST  A0  V 108 Trunc=108 Size=8 Line=1 Col=1 Alt=0

Cmd Filename Filetype Class User    at Node   Hold Records  Date   Time
    FEBSALES SCRIPT   PUN A FREDDY   VMSYS1  NONE      10  12/16  11:34:52
    MARSALES SCRIPT   PUN A FREDDY   VMSYS1  NONE      92  12/16  11:34:52
    APRSALES SCRIPT   PUN A FREDDY   VMSYS1  NONE     410  12/16  11:34:52
    RESEARCH LISTING  PUN A JONESML  VMSYS2  NONE   10210  12/16  11:34:52
    RESEARCH DATA     PUN A JONESML  VMSYS2  NONE     328  12/16  11:34:52
    PROFILE  EXEC     PUN A SMITHJK  VMSYS1  NONE     674  12/16  11:34:52
    PROFILE  XEDIT    PUN A MILLERF  VMSYS3  NONE      31  12/16  11:34:52
    NEWRPTFT DW370    PUN A KELLYTF  VMSYS1  NONE    2222  12/16  11:34:52

1= Help        2= Refresh   3= Quit      4= Sort(type)  5= Sort(date)   6= Sort(user)
7= Backward    8= Forward   9= receive  10=             11= Peek        12= Cursor
====>                                                                   XEDIT 1 FILE
```

*Fig. 2A*

```
                       VIEW THE NOTE
From: ROEMARY2--VMSYS1        Date and time    04/23/91 13:53:34  E01
To: JOHNSONG--VMSYS1 GE Johnson From: Mary Ann Roe  Department 45J  (ROEMARY2 at VMSYS1)
----  1545 West Middle Highway, Big City, New State 99991
----  1-212-555-1212 or 1-800-555-1212
Subject: Authorization for Sam Jones Expense Report Mr. Johnson,
         Expense Report from: Samuel Jones
    Expense Report Trip Dates: March 5, 1991 to March 7, 1991
           Paying Department: 47Y - Project Development
           Immediate Manager: Wendy Turner
                                                          ⌒63
To view details of the report:     .CMD FORMS VIEW 91003IRT0123
To approve the expenses:           .CMD FORMS APPROVE 91003IRT0123
To disapprove the expenses:        .CMD FORMS DISAPPR 91003IRT0123
To see 47Y's expenses to date:     .CMD LEDGER EXPENSES 47Y 1991

END OF NOTE

PF1 Alternate PFs  PF2 File NOTE    PF3 Keep   PF4 Erase   PF5 Forward
PF6 Reply  PF7 Resend  PF8 Print  PF9 Help  PF10 Next  PF11 Prev  PF12 Return
```

*Fig. 3*

```
                      VIEW THE NOTE
From: ROEMARY2--VMSYS1      Date and time    04/23/91 13:53:34  E01
To:   JOHNSONG--VMSYS1 GE Johnson From: Mary Ann Roe  Department 45J  (ROEMARY2 at VMSYS1)
----  1545 West Middle Highway, Big City, New State 99911
----  1-212-555-1212 or 1-800-555-1212
Subject: Authorization for Sam Jones Expense Report
         Expense Report from: Samuel Jones
         Expense Report Trip Dates: March 5, 1991 to March 7, 1991
         Paying Department: 47Y - Project Development
         Immediate Manager: Wendy Turner Mr. Johnson,
     From this screen you can view the form, approve or disapprove
the form, or, view ledger for the expenses used by department 47Y.
To do any of these, place your cursor under the highlighted action
words that indicate the action you want. Then press ENTER.

END OF NOTE

PF1 Alternate PFs  PF2 File NOTE      PF3 Keep   PF4 Erase  PF5 Forward
PF6 Reply  PF7 Resend  PF8 Print  PF9 Help  PF10 Next  PF11 Prev  PF12 Return
```

*Fig. 4*

METHOD AND SYSTEM FOR PROVIDING ACTIONS BY WAY OF ELECTRONIC DISTRIBUTIONS

SPECIFICATION

1. Field of the Invention

The present invention relates to interactive data processing systems and more particularly to electronic distribution systems, such as electronic mail systems, which occur on interactive data processing systems.

2. Background of the Invention

Data processing systems used in offices frequently provide an electronic mail capability. Electronic mail systems allow a user to create a piece of mail electronically and then send it to another user via a data processing system network and the associated user interfaces. Electronic mail facilitates the efficient exchange of information.

Prior art electronic mail consists only of information. Often this information is in the form of requests that the recipient do something or carry out an action. For example, a user may receive an electronic mail object, which has a message informing the user that his number of spool files exceeds his allowed number. The electronic mail object may request that the recipient delete some of his spool files. To carry out the action to delete spool files, the user must first exit the electronic mail program, enter the operating system program, remember how to delete his spool files, and then, finally, carry out the action by deleting spool files.

One disadvantage to this prior art electronic mail system is that the recipient is inconvenienced by having to perform numerous keystrokes in order to carry out the requested action. In addition, the recipient must decide how to implement the specific action. In many cases, the recipient may be ignorant of what a spool file is and how to carry out the requested action. If so, the recipient is inconvenienced even further in trying to figure out how to carry out the requested action.

SUMMARY OF THE INVENTION

It is an object of the present invention to provide a method and system that provides actions by way of electronic distributions, wherein the recipient need only authorize the carrying out of the actions in the mail.

The method and system of the present invention communicates an electronic mail object in a data processing system. A command is embedded in the electronic mail object before the electronic mail object is distributed. The command directs the data processing system to implement an action. After the electronic mail object has been distributed the command is implemented on the data processing system.

With the present invention, a first user or sender can compose an electronic mail object not only requesting a second user or recipient to act but the first user makes it easy for the second user to carry out the requested command. This is because the electronic mail object itself conveys the command, in addition to the request. Thus, the recipient need only to select the command to execute it.

By embedding the command in the electronic mail object, the present invention ensures a high degree of probability that the request will be carried out by the recipient of the electronic mail object. This is important because in some electronic mail systems, users are inundated by electronic mail. The less effort required by the recipient to fulfill the request, the more likely the recipient will be to implement the request. Furthermore, by providing the requested action, the first user is ensured that the request, once carried out, will be correctly fulfilled.

BRIEF DESCRIPTION OF THE DRAWINGS

FIG. 1 is a schematic view of a computer display screen showing a prior art electronic mail object displayed thereon.

FIG. 2 is a schematic view of a computer display screen, showing an electronic mail object of the present invention, in accordance with a preferred embodiment.

FIG. 2A is another computer display screen, obtained by executing a command from the electronic mail object of FIG. 2 and showing a list of spool files.

FIG. 3 is another computer display screen, showing another electronic mail object of the present invention.

FIG. 4 is another computer display screen, showing an electronic mail object of the present invention, in accordance with another embodiment.

FIG. 6 is a flow chart showing the embedding of actions, or commands in an electronic mail object. FIG. 7 is a flow chart showing the execution of an action in an electronic mail object.

DESCRIPTION OF PREFERRED EMBODIMENT

The method and system of the present invention provide an easy and simple way for a recipient of an electronic mail object to carry out a sender's request contained in the electronic mail object. The electronic mail object contains not only a sender's request, but a means for the recipient to carry out the request. The means to carry out the request takes the form of an action. The recipient needs only to select the action, wherein it will be identified and executed.

To illustrate the present invention, the prior art will first be examined. In FIG. 1, there is shown a schematic representation of a computer screen 11. A prior art electronic mail object is displayed on the screen 11. The electronic mail object contains a message asking the recipient, G. E. Johnson, to receive or delete some of his spool files. The reason for the request is because the number of spool files in his virtual reader has exceeded his limit. After reading this message contained in the electronic mail object, Mr. Johnson decides to delete at least some of his spool files. But, as there are quite a few spool files, he is unsure which ones to delete. So, Mr. Johnson must figure out how to go about displaying a list of his spool files and then how to go about deleting selected files. First, he must exit the electronic mail program. Then, he enters the operating system program. Once in the operating system program, Mr. Johnson executes the proper command for listing his spool files. After reviewing the list of spool files and deciding which files to delete, he provides the proper command for deleting the files. All of the above steps assume that Mr. Johnson knows how to list and delete spool files.

Referring now to FIG. 2, there is shown a computer screen 11 with an electronic mail object as provided by the present invention. The information conveyed is the same as the prior art message of FIG. 1, but in addition the electronic mail object includes plural actions for carrying out the request. When Mr. Johnson reads the electronic mail object of FIG. 2 and decides to delete some of his spool files, he simply follows the instructions provided in the message. Thus, to view a list of spool files, he selects the action or command 13 ".CMD RDRLIST" by placing the cursor under the line ".CMD RDRLIST" and by pressing an actuation key such as ENTER. This selects and executes the command to display the list of his spool files, wherein the list is displayed as illustrated in FIG. 2A. To delete all of his spool files, Mr. Johnson selects the action 15 ".CMD PURGE READER ALL" by placing the cursor under the line ".CMD PURGE READER ALL" and pressing ENTER.

Thus, to carry out the request of the electronic mail object, the recipient needs only to select and execute the action provided in the electronic mail object. This saves the recipient's time and effort in the form of fewer keystrokes and in deciding how to implement the request in the data processing system.

Figure 5:
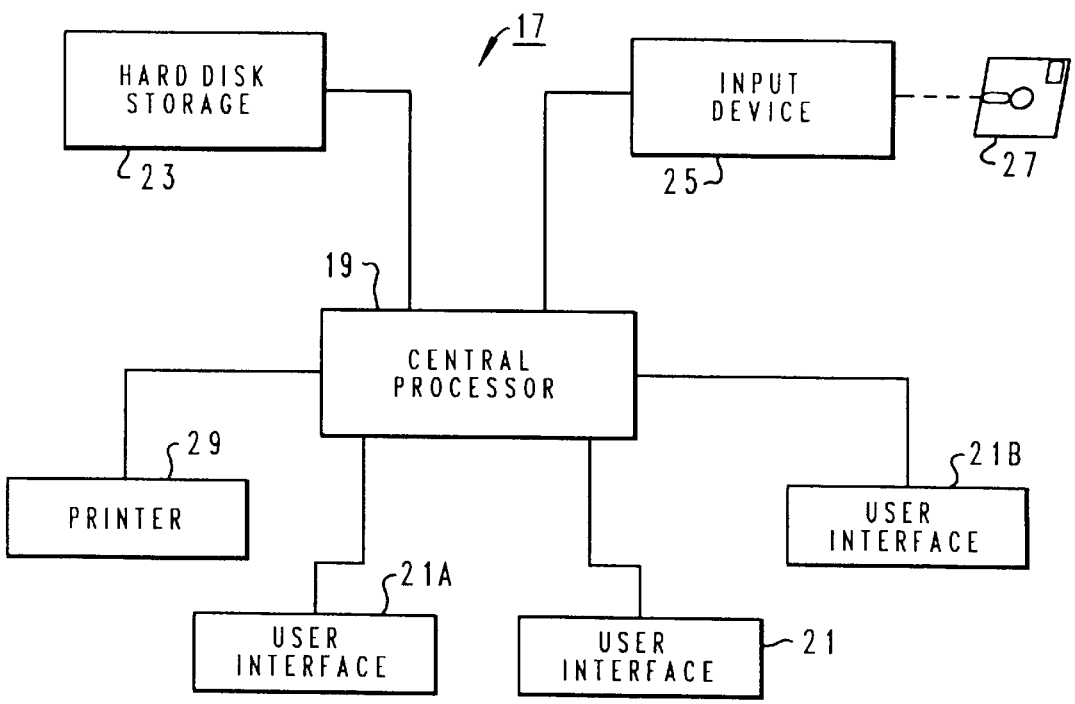
FIG. 5 is a block diagram showing an interactive data processing system in accordance with the present invention.

In FIG. 5, there is shown a data processing system 17. The system has a central processor 19, to which are connected plural user interfaces 21, 21A, 21B. Each user interface 21 may contain a display, a keyboard, and other interface devices. Each display has a screen 11 such as is shown in FIGS. 1–4. Also connected to the central processor 19 is a hard disk storage device 23 and an input device 25. The input device accepts and reads media 27 with computer program logic recorded thereon. This logic implements the present invention of providing of actions by electronic mail. The particular medium 27 may include a floppy disk or magnetic tape. There is also a printer 29 connected to the central processor 19.

The user interfaces 21, 21A, 21B are interconnected together through the central processor 19 so as to form a network. The user interfaces may be directly connected to the central processor or may be connected to the central processor over a telecommunications system. The data processing system 11 has an electronic mail system that enables each user interface to communicate with the other user interfaces.

The method of the present invention will now be described with reference to FIGS. 6 and 7. In the flow chart, the following graphical conventions are observed: a diamond for a test or decision, a rectangle for a process or function and a circle for a connector in exiting to or entering from another part of the flow chart. These conventions are well understood by those skilled in the art, and the flow charts are sufficient to enable one skilled in the art to write code in any suitable computer programming language, such as BASIC, PASCAL or C for a computer such as the IBM Personal System/2 (PS/2) family of computers which supports these languages.

Figure 6:
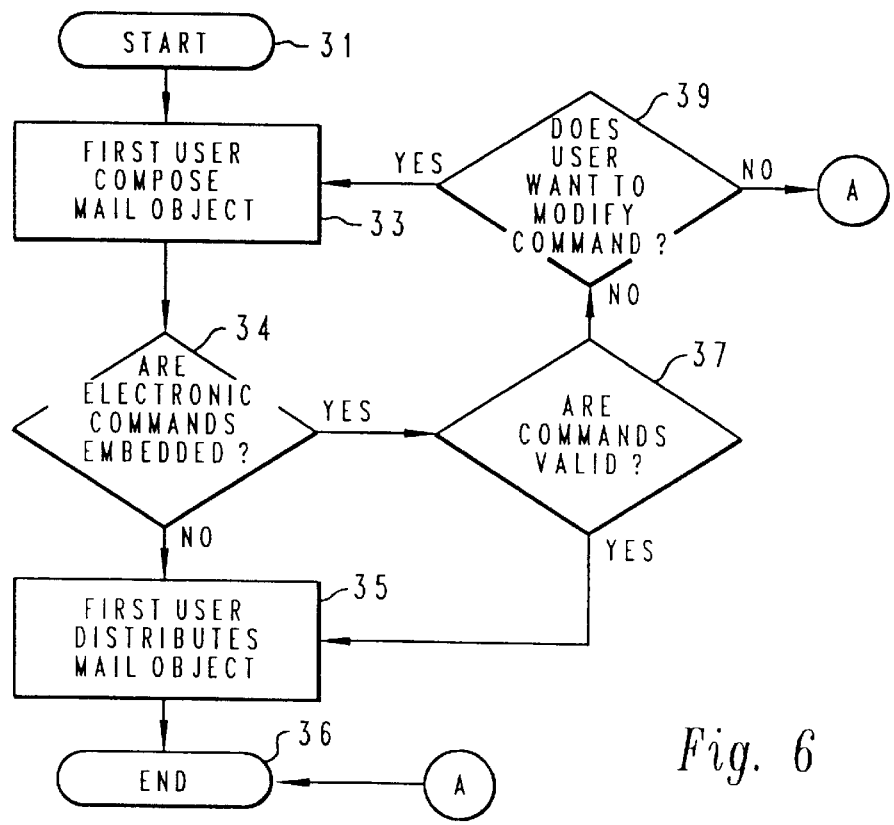
FIGS. 6 and 7 are flow charts of the method of the present invention, in accordance with a preferred embodiment.

The method begins by having a first user or sender compose an electronic mail object and embed an action or command therein (see FIG. 6). The first user then distributes the electronic mail object. When the second user or recipient reviews the message contained in the electronic mail object and then selects a command, the method of FIG. 7 is invoked, wherein the command is extracted from the electronic mail object, after which the command is executed.

Referring now to FIG. 6, in the first step, the method is started and initialized, step 31. Then, a first user composes an electronic mail object, step 33. The electronic mail object contains a message and one or more commands. For example, the first user, Mary Ann Roe, would type the message shown in FIG. 2. When embedding the command in the electronic mail object, the first user must follow the convention that has been established for defining the start and end of each command. In FIG. 2, the start of the command is indicated by ".CMD", while the end of the command is indicated by the end of the line. As described above, the command "RDRLIST" displays a list of the recipient's reader files, while the command "PURGE READER ALL" deletes all of the recipient's reader files.

After the electronic mail object has been composed, the method determines if there are any commands embedded in the electronic mail object, step 34. If NO, the method proceeds to step 35, wherein the first user distributes the electronic mail object. Distribution can be over an electronic mail network between two user interfaces 21A, 21B. Alternatively, distribution can be by floppy disc. After the electronic mail object is distributed, the method ends, step 36.

If the result of step 34 is YES, the method proceeds to step 37, wherein the method determines if the embedded commands are valid. If the commands embedded in the electronic mail object are valid, then the method proceeds to step 35 for distribution of the electronic mail object. If the embedded commands are not valid, then the method proceeds to step 39. In step 39, a determination is made if the user wants to modify the invalid command. If YES, then the method returns to step 33. If NO, the method ends, step 36.

When the second user or recipient receives the electronic mail object, the second user can select one of the embedded commands. Once a command has been selected, the method of FIG. 7 is invoked, wherein the command is isolated from the rest of the electronic mail object so that the command can be identified and executed. In step 41, the method is started and initialized. In step 43, the electronic mail object is searched for the start of the command. This involves searching the memory containing the electronic mail object for ".CMD", which designates the beginning of the command. After the search, the method proceeds to step 45 to determine if the search was successful, namely if the start of the command was found. If NO, then the method proceeds to step 47, wherein the error is reported to the user. Then, the method proceeds to step 49, wherein there is a return to the display of the electronic mail object. If the result of step 45 is YES, then in the next step 51, the electronic mail object is searched for the end of the command, which is the end of the line. Then, in step 53, a determination is made if the end was found. If NO, the method proceeds to step 47 to report the error to the user. If YES, the method proceeds to step 55, wherein the command "RDRLIST" is extracted from the electronic mail object.

In step 57, the command is prepared as required by the operating system. The command is put into a form that the operating system will accept. Next, in step 59, the command is executed, wherein a list of the second user's spool files is displayed. After executing the command, the method returns to the display of the electronic mail object, step 49. Finally, the method ends, step 61. If another command is selected by the second user, then steps 41–49 are repeated.

FIG. 3 illustrates another electronic mail object. In this electronic mail object, the commands 63 are located on the same lines as other parts of the message. The commands are again identified by ".CMD" at the beginning and the end of line at the end.

In FIG. 4, there is shown another, more user friendly, way of presenting the commands 65 to the second user. The bold words "view", "approve", "disapprove" and "view ledger" represent commands 65. Each of these commands is an English language word. The meaning of each command 65 is apparent to the second user by the word itself and by its use in the message of the electronic mail object. The start and end of each command is invisible to the second user. To select the desired command, the second user merely follows the directions given in the message of the electronic mail object, then places the cursor under the command and presses ENTER. The method then isolates and executes the selected command.

Referring back to FIG. 7, step 57 of the method prepares the selected command into a form that the operating system will accept. Step 57 allows the provision of user friendly commands. In addition, step 57 allows a single command in the mail object to be translated into plural operating system commands executed in a specified sequential order.

A security provision can be implemented with the present invention to avoid someone from unscrupulously sending an action that would, if executed, produce unintended results. For example, in FIG. 4, a first user could program the "view" command 64 to, instead of listing the form, delete all of the second user's files. To prevent such a problem from occurring, the second user can produce a table of acceptable commands. This table of commands would be utilized to determine whether the mailed command should be executed.

Figure 7:
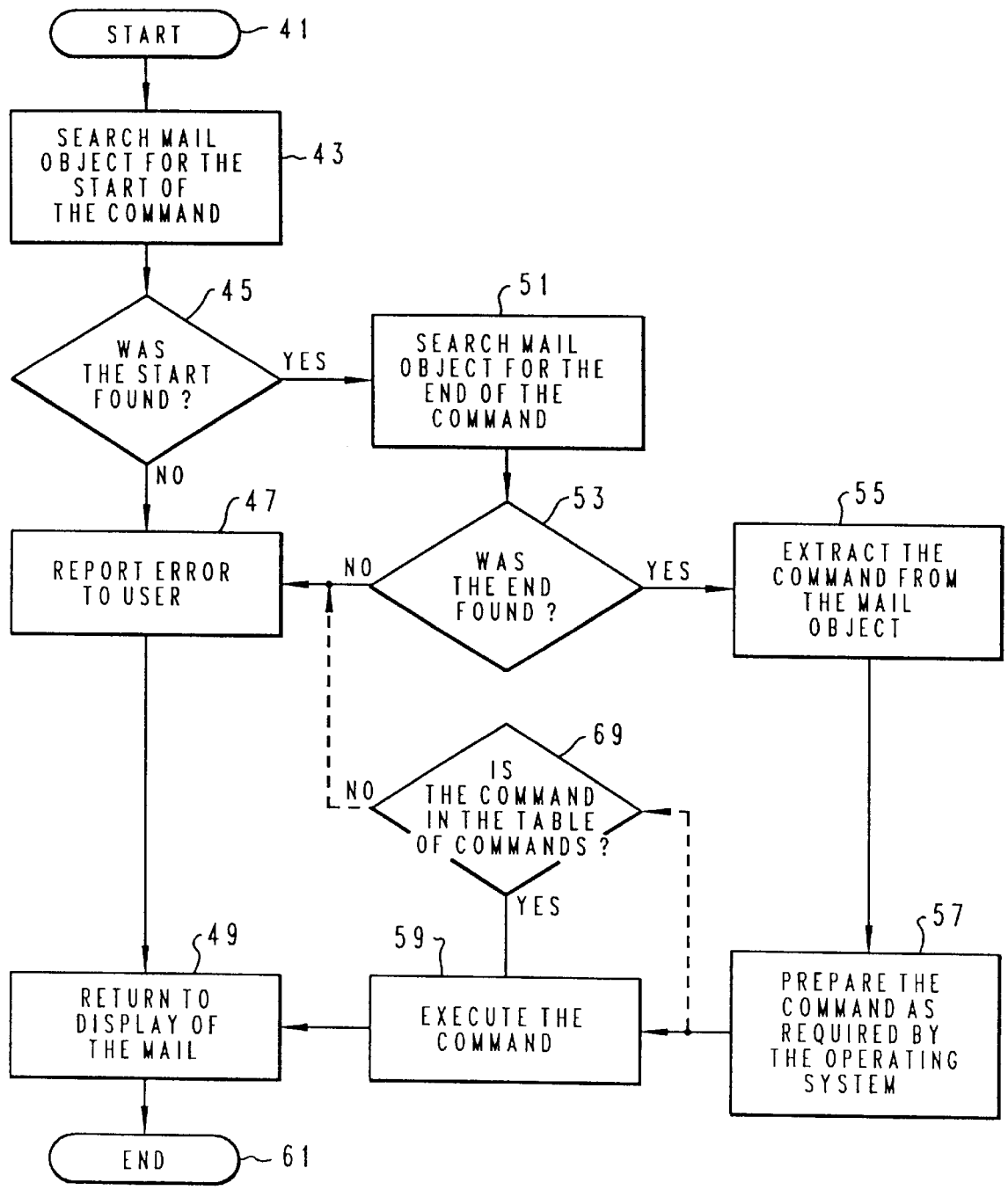

Implementation of the security feature is shown in FIG. 7, with dashed lines. After the selected command has been readied for execution, the selected command is compared against the table of commands, step 69. If the selected command is found in the table of commands, then it is executed, step 59. If it is not found in the table, then an error message is produced, step 47.

Although the present invention has been described as using a cursor to select a particular command, other means of selection can also be used. For example, a command can be selected by a mouse, a light pen, a program function key on the keyboard, or any other like device.

The foregoing disclosure and the showings made in the drawings are merely illustrative of the principles of this invention and are not to be interpreted in a limiting sense.

We claim:

1. A computer implemented method of communicating an electronic mail object in a data processing system, comprising the steps of:
    a) providing said electronic mail object, which electronic mail object contains a message for a human user, and embedding within said electronic mail object a command for directing said data processing system to implement an action, said embedding occurring by use of an input device on said data processing system;
    b) distributing said electronic mail object with said embedded command from a first user interface on said data processing system to a second user interface on said data processing system and presenting said electronic mail object with said embedded command on said second user interface to a recipient user.

2. The method of claim 1 further comprising the steps of:
    a) selecting, at said second user interface, said command from said electronic mail object after said electronic mail object has been distributed;
    b) implementing said selected command on said data processing system.

3. The method of claim 2 further comprising the step of identifying said selected command in said electronic mail object before said selected command is implemented.

4. The method of claim 3 wherein:
    a) said step of embedding within the electronic mail object a command further comprises the step of providing starting and ending markers for said command;
    b) said step of identifying said command further comprises the steps of searching for said starting and ending markers and then extracting said command, as identified by said starting and ending markers, from said electronic mail object.

5. The method of claim 4, further comprising the steps of:
    a) comparing said selected command against a table of allowed commands;
    b) determining, based on said comparison between said selected command and said table, whether to implement said selected command.

6. The method of claim 2, further comprising the steps of:
    a) comparing said selected command against a table of allowed commands;
    b) determining, based on said comparison between said selected command and said table, whether to implement said selected command.

7. The method of claim 2, wherein:
    a) said step of providing said electronic mail object further comprises the step of providing said command in a human language form such that the meaning of the command is apparent to a user;
    b) said step of implementing said command on said data processing system further comprises the step of converting said human language form command to a language form command that is implementable on said data processing system by said data processing system.

8. The method of claim 1, wherein:
    a) said step of embedding within said electronic mail object a command is the step of embedding within said electronic mail object a first command;
    b) said step of providing said electronic mail object further comprises the step of embedding within said electronic mail object a second command, said second command being mutually exclusive of said first command.

9. The method of claim 1 wherein said command directs said data processing system to implement an action that is independent of said message within said electronic mail object.

10. A data processing system for communicating an electronic mail object, comprising:
    a) means for providing said electronic mail object, said electronic mail object containing a message for a human user, and means for embedding within said electronic mail object a command for directing said data processing system to implement an action;
    b) means for distributing said electronic mail object with said embedded command from a first user interface on said data processing system to a second user interface on said data processing system and for presenting said electronic mail object with said embedded command on said second user interface to a recipient user.

11. The data processing system of claim 10 further comprising:
    a) means for selecting, at said second user interface, said command from said electronic mail object after said electronic mail object has been distributed;
    b) means for implementing said selected command on said data processing system.

12. The data processing system of claim 11 further comprising means for identifying said selected command in said electronic mail object before said selected command is implemented.

13. The data processing system of claim 12 wherein:
    a) said means for embedding within the electronic mail object a command further comprises means for providing starting and ending markers for said command;

b) said means for identifying said command further comprising means for searching for said starting and ending markers and then for extracting said command, as identified by said starting and ending markers, from said electronic mail object.

14. The data processing system of claim 10, further comprising:
   a) means for comparing said selected command against a table of allowed commands;
   b) means for determining, based on said comparison between said selected command and said table, whether to implement said selected command.

15. The data processing system of claim 10, wherein:
   a) said means for embedding within said electronic mail object a command is means for embedding within said electronic mail object a first command;
   b) said means for providing said electronic mail object further comprises means for embedding within said electronic mail object a second command, said second command being mutually exclusive of said first command.

16. The data processing system of claim 10 wherein said command directs said data processing system to implement an action that is independent of said message within said electronic mail object.

17. A computer implemented method of communicating an electronic mail object in a data processing system, comprising the steps of:
   a) providing said electronic mail object, which electronic mail object contains a message for a human user, and embedding within said electronic mail object a command for directing said data processing system to implement an action, said embedding occurring by use of an input device on said data processing system;
   b) distributing said electronic mail object with said embedded command from a first user interface on said data processing system to a second user interface on said data processing system and presenting said electronic mail object with said embedded command on said second user interface;
   c) said step of embedding within said electronic mail object a command for directing said data processing system to implement an action further comprises the step of embedding said command within said message so that said electronic mail object has a first portion of said message that precedes said command and a second portion of said message that succeeds said command, said command being displayed on said second user interface with emphasis relative to said first and second portions of said message.

18. A data processing system for communicating an electronic mail object, comprising:
   a) means for providing said electronic mail object, said electronic mail object containing a message for a human user, and means for embedding within said electronic mail object a command for directing said data processing system to implement an action;
   b) means for distributing said electronic mail object with said embedded command from a first user interface on said data processing system to a second user interface on said data processing system and for presenting said electronic mail object with said embedded command on said second user interface;
   c) said means for embedding within said electronic mail object a command for directing said data processing system to implement an action further comprises means for embedding said command within said message so that said electronic mail object has a first portion of said message that precedes said command and a second portion of said message that succeeds said command, said command being displayed on said second user interface with emphasis relative to said first and second portions of said message.

* * * * *